Sept. 13, 1949.　　　　J. F. STOKES　　　　2,481,957
GRAIN TREATING MACHINE

Filed Oct. 28, 1948　　　　　　　　　　　　2 Sheets-Sheet 1

John F. Stokes
INVENTOR.

Sept. 13, 1949.　　　　J. F. STOKES　　　　2,481,957
GRAIN TREATING MACHINE
Filed Oct. 28, 1948　　　　　　　　　　2 Sheets-Sheet 2
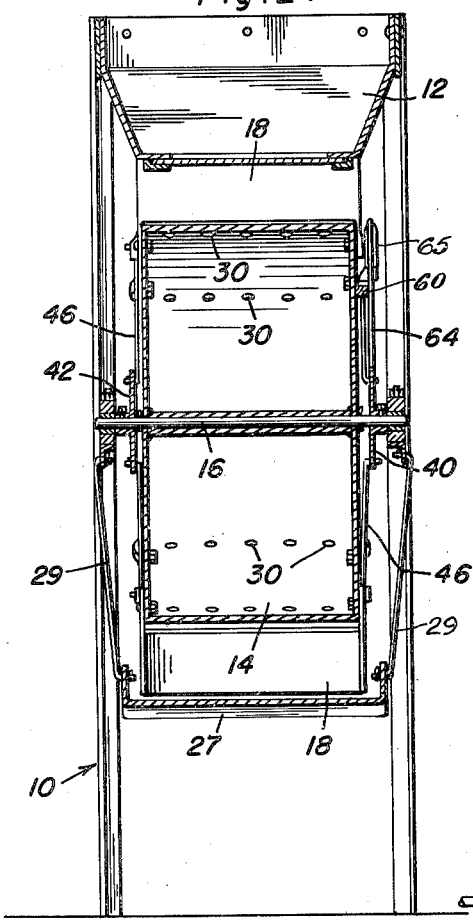
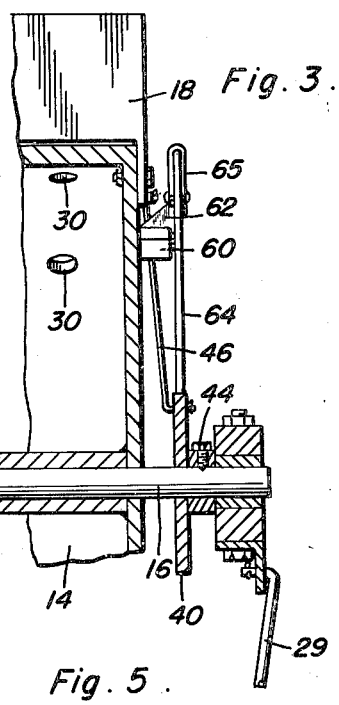
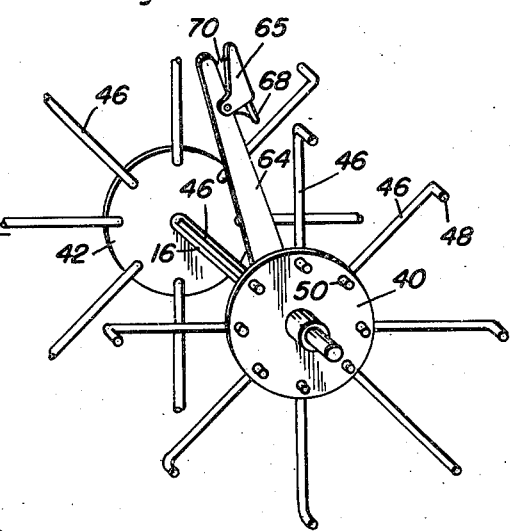
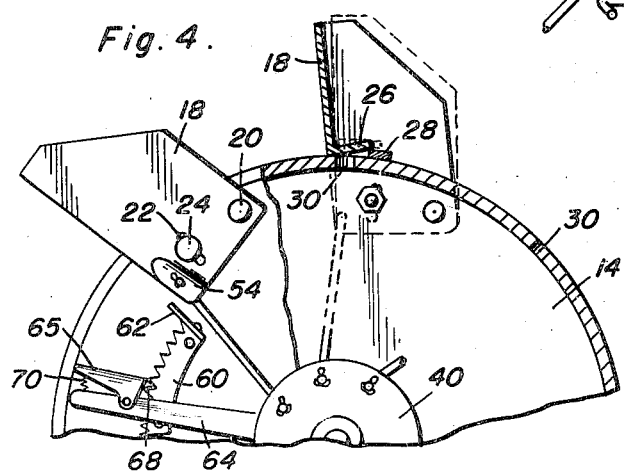
John F. Stokes
INVENTOR.

Patented Sept. 13, 1949

2,481,957

UNITED STATES PATENT OFFICE 2,481,957

GRAIN TREATING MACHINE

John F. Stokes, Alexandria, Minn.

Application October 28, 1948, Serial No. 57,044

2 Claims. (Cl. 259—180)

This invention relates to improvements in my Patent No. 2,200,434, dealing with Grain treating machines.

An object of this invention is to thoroughly mix dust with grain whereby the force of the grain flowing by gravity from a hopper is utilized to actuate the mixing mechanism, characterized by improved means wherein the volume of dust which is mixed with the grain may be conveniently regulated by manipulation of a single handle, whereby all of the number of buckets provided about the periphery of a drum are pivotally actuated to open and close the ports in the periphery of the drum.

Ancillary objects and features of novelty such as simplicity of structure will become apparent to those skilled in the art, in following the description of the preferred form of the invention, illustrated in the accompanying drawings, wherein:

Figure 2 is a longitudinal sectional view taken substantially on the line 2—2 of Figure 1 and in the direction of the arrows;

Figure 3 is an enlarged sectional detailed construction illustrating the locking means and means for adjusting the buckets disposed about the periphery of the rotating drum;

Figure 4 is an enlarged sectional view illustrating the detail of the buckets and showing a portion of the means for locking the buckets in selected pivoted positions in elevation;

Figure 5 is a perspective view of a portion of the improved structure for adjusting the buckets.

Figure 1:
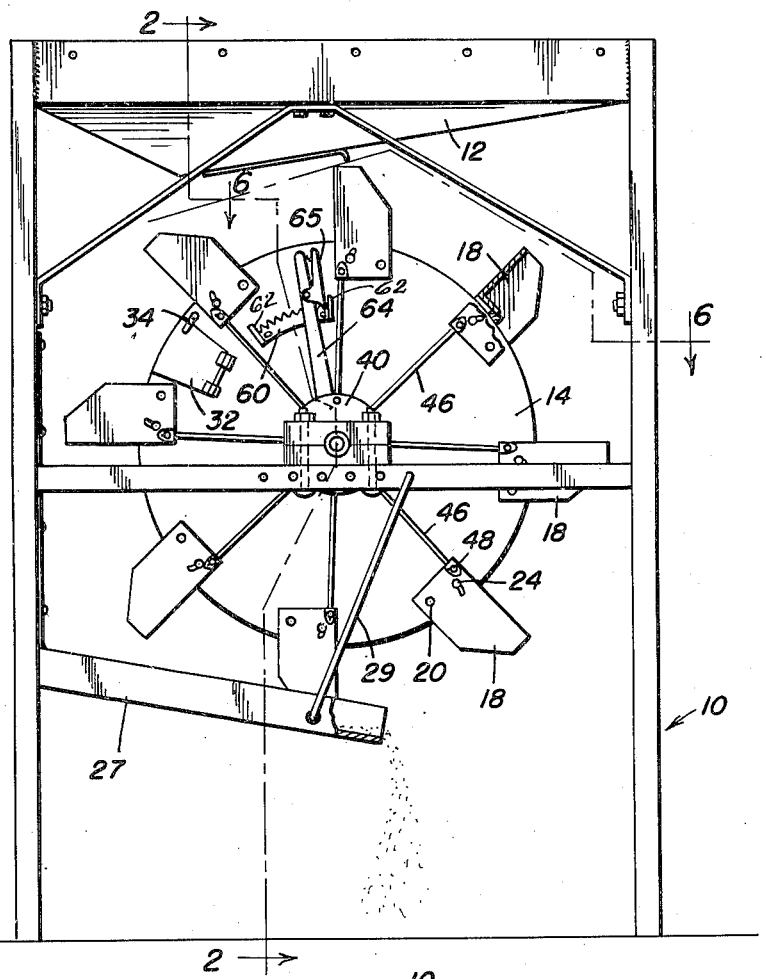
Figure 1 is a side elevational view of the preferred form of the invention, portions being broken away in section to illustrate detail of construction.
Figure 6:
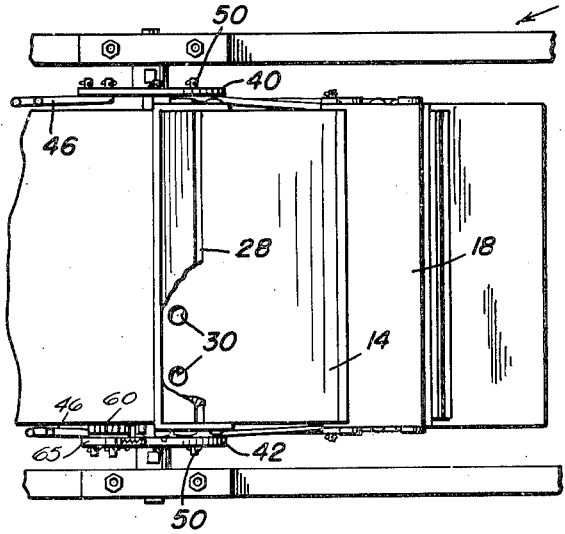
Figure 6 is a sectional view taken substantially on the line 6—6 of Figure 1 and in the direction of the arrows.

Substantially all of the supporting structure generally indicated at 10 is identical to that shown in my patent referred to above. The hopper 12 carried by the supporting structure is similar thereto, as is the rotating drum 14 disposed thereunder mounted on a rod or shaft 16.

My improved structure evolves about the plurality of buckets 18 mounted by means of pivot pins 20 to the sides of the sides of the said drum 14. Slots 22 are supplied in the sides of the buckets having pins 24 extending therethrough, and anchored to the sides of the drum. This renders the buckets pivotally operable but limited in travel by the confines of the slots 22.

Seated beneath the internal flange 26 of each bucket is a stop 28, preventing total closing of the ports 30 which are formed in the periphery of the said drum 14.

The said drum 14 has a lateral opening therein, covered by a closure or door 32 which is hinged at the bottom and which has a latch 34 of conventional description adjacent the top thereof. This opening is used for the purpose of filling the drum 14 with dust for admixture with grain falling from the hopper.

The trough 27 seen in Figure 2 and supports 29 are identical to that shown and described, serving the same function as that in my above referred to patent.

My improved structure includes a pair of hubs 40 and 42 which are attached to the shaft 16 by means of set screws 44 or the like. Extending radially from the hubs is a number of links 46 or arms having incurved end portions 48 and 50 on each. The incurved end portions 50 are pivotally disposed in the hub, while the incurved end portions 48 are disposed in recessed portions 54 of the buckets 18. It is appreciated that upon rotation of the hub 40, the buckets 18 will be pivotally actuated in order to selectively open and close the ports 30 a preselected amount.

In order to retain the buckets in this position, a gear segment or toothed member 60 is rigidly mounted on a side of the drum 14 and has stops 62 at the ends thereof. A brake arm 64 having a keeper 65 pivoted thereto is rigidly attached to the hub 40. The pivoted keeper has a sharpened end portion 68 engaging one of the number of teeth on the gear segment 60. By utility of the spring 70 or other suitable equivalent biasing means interposed between the keeper and the brake arm 64, the said keeper may be maintained firmly in the teeth of the segment 60 thereby retaining the buckets in the preselected adjusted positions.

While there has been described and illustrated but one form of the invention, it is apparent that many variations may be made without departing from the spirit of the invention.

Having described the invention, what is claimed as new is:

1. In a grain treating machine, a supporting structure, a hopper mounted on said supporting structure, a drum for the reception of dust rotatively mounted on the supporting structure beneath the hopper, said drum having peripheral ports for the discharge of the dust, means on said drum engageable by grain flowing from said hopper for rotating said drum, mechanical means carried by said supporting structure for regulating said drum rotating means, said drum rotating means including a plurality of buckets, means pivotally mounting said buckets on said drum over said ports, a rod carried by said supporting structure mounting said drum, said mechanical means including a hub mounted on said rod, arms pivoted to said hub and said buckets for simultaneously pivotally adjusting said buckets, and means carried by said drum and said hub for locking said hub in selected positions with relation to said drum.

2. In a grain treating machine, a supporting structure, a hopper mounted on said supporting structure, a drum for the reception of dust rotatively mounted on the supporting structure beneath the hopper, said drum having peripheral ports for the discharge of the dust, means on said drum engageable by grain flowing from said hopper for rotating said drum, mechanical means carried by said supporting structure for regulating said drum rotating means, said drum rotating means including a plurality of buckets, means pivotally mounted said buckets on said drum over said ports, a rod carried by said supporting structure mounting said drum, said mechanical means including a hub mounted on said rod, arms pivoted to said hub and said buckets for simultaneously pivotally adjusting said buckets, and means carried by said drum and said hub for locking said hub in selected positions with relation to said drum including a tooth member mounted on said drum, a brake arm fixed to said hub, and a pivoted keeper carried by said brake arm engaging said tooth member.

JOHN F. STOKES.

REFERENCES CITED

The following references are of record in the file of this patent:

UNITED STATES PATENTS

| Number | Name | Date |
|--------|------|------|
| 906,754 | Tschirgi | Dec. 15, 1908 |
| 2,200,434 | Stokes | May 14, 1940 |